United States Patent [19]
Krebs

[11] Patent Number: 5,742,560
[45] Date of Patent: Apr. 21, 1998

[54] SEISMIC IMAGING USING WAVE EQUATION EXTRAPOLATION

[75] Inventor: Jerome R. Krebs, Houston, Tex.

[73] Assignee: Exxon Production Research Company, Houston, Tex.

[21] Appl. No.: 707,574

[22] Filed: Sep. 4, 1996

Related U.S. Application Data

[62] Division of Ser. No. 241,889, May 12, 1994, Pat. No. 5,596,548.

[51] Int. Cl.⁶ ........................................ G01V 1/28
[52] U.S. Cl. .................... 367/57; 367/50; 367/73
[58] Field of Search .................. 367/50, 56, 57, 367/59, 73; 364/421, 422

[56] References Cited

U.S. PATENT DOCUMENTS

| | | | |
|---|---|---|---|
| 4,627,036 | 12/1986 | Wyatt | 367/57 |
| 4,766,574 | 8/1988 | Whitmore, Jr. et al. | 367/50 |
| 4,926,393 | 5/1990 | McClellan et al. | 367/57 |
| 5,502,687 | 3/1996 | Mackay | 367/54 |

*Primary Examiner*—Ian J. Lobo
*Attorney, Agent, or Firm*—Stephen P. Koch

[57] ABSTRACT

A method for producing seismic images from seismic data obtained from two different datums. Traveltimes between the two datums are determined from either measurements or an assumed velocity field. An extrapolation of the data to simulated source and receiver locations is carried out using any form of the wave equation which does not require velocity field information. After extrapolation, the data at the simulated source and receiver locations is processed using standard seismic imaging techniques. The method can be applied to simulate borehole, crosshole, or multi-borehole seismic data.

1 Claim, 6 Drawing Sheets

SEISMIC IMAGING USING WAVE EQUATION EXTRAPOLATION

This application is a division of application Ser. No. 08/241,889, filed May 12, 1994, which application is now U.S. Pat. No. 5,596,548.

FIELD OF THE INVENTION

This invention relates to the field of seismic imaging. More specifically, the invention involves wave equation extrapolation of seismic data to an alternate datum.

BACKGROUND OF THE INVENTION

Seismic prospecting techniques are commonly used in the search for subsurface hydrocarbon deposits. In seismic prospecting, an energy source generates signals which propagate into the earth and reflect from subsurface formations. The reflections are recorded by a multitude of receivers on or near the surface of the earth, or in an overlying body of water. This process is repeated for a number of source and receiver locations, and the recorded reflections are processed to develop images of the subsurface. Skilled analysts can use those images to predict whether oil or gas is present in the formations.

The cost and complexity of seismic data acquisition and processing, as well as the accuracy of the images that are obtained, are largely functions of the locations at which the sources and receivers are placed. For example, where the sources and receivers are on the surface, acquisition costs are generally low and the data can be analyzed in a straightforward manner using generally well understood types of data processing. Typically, the data from combinations of source and receiver positions are stacked together to generate an estimated image of the subsurface formations. Next, inaccuracies in the image, which result from subsurface structural complexities and seismic velocity variations, are eliminated to the extent possible by reflector migration. Those skilled in the art of seismic data processing will understand that migration may be performed either before or after stacking. The fact that both the sources and the receivers are on the surface and therefore have the same reference position, referred to as the datum, facilitates data processing.

Despite that low cost and relative simplicity, surface seismic data does pose challenges to the analyst. A subsurface seismic velocity model must be generated to stack the data and to perform the migration. The accuracy of the images produced depends to a great extent on the accuracy of this velocity model. Unfortunately, the model is often only an estimate of the actual subsurface velocity structure, not necessarily based on sufficient data, and inaccuracies in stacking and migration may result. In addition, images from surface seismic data are degraded in quality due to the influence of the weathered near-surface layer, which may also have irregular topography, on the seismic reflections.

The problems associated with surface seismic data are particularly acute where, for example, the analyst must accurately migrate steeply dipping or overturned reflectors such as salt flanks, image below complex velocity structures such as salt sills, or image in areas where a complex near-surface layer causes severe ray-path complications or static time shift problems. One method of overcoming these problems is to obtain data from sources and/or receivers placed below the surface in boreholes. Borehole seismic data are less sensitive to velocity errors because the raypaths used to form the images are much shorter than those used for surface seismic imaging. Borehole seismic data may also eliminate salt flank, salt sill, and weathered near-surface layer velocity complications by completely bypassing those features.

Two broad categories of borehole data acquisition techniques are commonly used: vertical seismic profiling and crosshole surveying. Vertical seismic profiling (VSP) may involve either forward or reverse geometry data gathering. Forward profiling involves placing seismic sources on the surface and receivers in a borehole. Reverse profiling places the sources in the borehole and the receivers on the surface. In either case, VSP surveys have several advantages over surface seismic data acquisition. These advantages include an improved ability to construct lateral images, reduced errors due to ray-bending and attenuation effects, and improved horizontal and vertical data resolution.

Crosshole surveying involves placing seismic sources in a first borehole and receivers in a second borehole. A number of advantages result from this source-receiver geometry, as compared to surface seismic and VSP data. Direct arrival travel times, required to form images of the velocity structure between wells, are relatively easy to determine from crosshole data. Crosshole data also have the advantage of being insensitive to near-surface velocity variations because the sources and receivers can be positioned below complex velocity structures. This advantage eliminates the problems associated with reflector imaging through such structures. Finally, cross-hole data have much broader bandwidths than do surface seismic or VSP data, leading to better quality images when data processing has been completed.

Despite their advantages, VSP and crosshole data suffer from several problems that limit their usefulness. In both types of data, the receivers have a different datum than do the sources. For example, forward VSP data involves sources with a surface datum and receivers with a borehole datum. This dual datum data increases the complexity and cost of data processing as compared to data which is referenced to a single datum. In addition, both VSP and crosshole data are expensive to gather. Part of that expense results from data acquisition costs, which includes the cost of drilling a borehole, if one is not otherwise available. Finally, both data types have processing limitations. For example, accurate images of steeply dipping structures are difficult to generate using either technique.

Crosshole and reverse profiling VSP data are particularly expensive to acquire because downhole seismic sources must be used. Because these sources have to be weak enough not to cause damage to the borehole, the strength and range of penetration of the signal is limited. Although the signal-to-noise ratio can be improved by repeated firing of the source, that process is expensive and time-consuming. As a result, crosshole data cannot generally be gathered between wells that are more than a few thousand feet apart.

Because of the individual advantages of surface seismic and borehole data, the oil and gas industry has focused in recent years on developing combined techniques which preserve the benefits of each while eliminating the disadvantages. For example, U.S. Pat. No. 4,926,393 to McClellan, Adams, and Cox ("McClellan") discloses a method of data acquisition and analysis intended to improve the accuracy of steep dip imaging by allowing application of surface data processing techniques to VSP data. McClellan first obtains VSP data from a multitude of surface source positions covering a range of distances from a borehole in which the VSP receivers have been placed. The source positions are on the opposite side of the borehole from a geophysical feature of interest. The borehole receivers record both direct arrival and reflection signals. The time shift between each reflection signal and the corresponding direct arrival is used to extrapolate the surface sources to the borehole. Because both the sources and the receivers have the same borehole datum after the extrapolation, the dataset is more amenable to conventional processing.

Despite the simplifications associated with the ability to use conventional processing, McClellan suffers from several limitations. First, the VSP data that is required is expensive because the signal-to-noise ratio must be sufficient to determine both direct arrival times and reflection times. In addition, depending on the location of the borehole, shallow dips can only be imaged within a limited region of the subsurface. Finally, because McClellan relies on travel time calculations only, the extrapolation of the data from the surface to the borehole is inaccurate due to the loss of amplitude and phase information.

The publication of R. Ala'i, "From Surface to VSP Data" *Delft Vol. IV: From Seismic Measurements to Rock and Pore Parameters*, 1993, proposes a method superficially similar to McClellan, but employing surface data only. Ala'i simulates VSP data by extrapolating surface seismic receivers to the location of a well. Images are then obtained from the extrapolated data using conventional VSP imaging techniques. However, the extrapolation must be performed using an assumed velocity model rather than from measured travel times. As a result, the accuracy of the simulated VSP data is limited by the accuracy of that model. Due to that limitation, the method does not reliably improve imaging accuracy as compared to conventional surface imaging techniques.

Other commonly employed methods of imaging reflectors using VSP data include the VSP-CDP transform and direct prestack migration. The VSP-CDP transform, as in U.S. Pat. No. 4,627,036 to K. D. Wyatt for example, determines, for each sample in each input trace, the subsurface location that would produce a reflection at that time sample. This determination is based on a model for the velocity of propagation of seismic waves in the region to be imaged. Assumptions may also be made about the dip of the reflectors. Direct prestack migration methods, as in the publication by J. W. Wiggins "Kirchoff Integral Extrapolation and Migration of Nonplanar Data," *Geophysics*, Vol. 49, No. 8, 1984, use the wave equation to extrapolate borehole seismic data to the location where an image is desired.

Both the VSP-CDP transform and direct prestack-migration suffer from the velocity model limitations discussed above. Specifically, an input required by both techniques is the seismic interval velocity field for the region to be imaged. Without an accurate estimate of that field, the techniques will not image reflectors into the correct position. In addition, images from different source locations will not add coherently, resulting in low signal-to-noise ratio images. The method of Blakeslee and Chen in U.S. Pat. No. 5,481,501 addresses this velocity field limitation for the limited application of crosshole traveltime tomography. The method, which requires two boreholes, allows a crosshole seismic velocity field to be determined from surface seismic sources and downhole receivers. However, the method is not applicable to single borehole data acquisition configurations, and cannot be used for reflector imaging or diffraction tomography.

From the foregoing it can be seen that an improved method of imaging complex seismic features is required. Preferably, the method should allow the use of a source-receiver configuration during data acquisition which is cost-effective and straightforward to implement. The method should also involve transformation of the data into a source-receiver configuration from which accurate images of subsurface structural features can be obtained using convenient, cost-effective data processing and interpretation techniques. The transformation from the data acquisition configuration to the imaging configuration should retain the data's important amplitude and phase information, and not require knowledge of the seismic velocity field in the extrapolation region. The present invention satisfies these needs.

SUMMARY OF THE INVENTION

The present invention is a method of wave equation extrapolating seismic data from a data acquisition configuration to an imaging configuration which is more convenient for producing seismic images or which allows more accurate images to be produced. The data acquisition configuration involves sources and receivers placed along at least two data acquisition datums. The imaging configuration will involve simulated sources and receivers positioned along at least one imaging datum.

The wave equation extrapolation relies on traveltimes which are determined from either measurements or from an assumed velocity model. Where measurements are involved, traveltimes between the data acquisition datums are used to compute traveltimes to the configuration of simulated sources and receivers on the imaging datum. Where a velocity model is involved, the model is used to directly calculate the traveltimes to the configuration of simulated sources and receivers.

The extrapolation is carried out by any convenient form of the wave equation which does not require velocity field information. Use of the wave equation also allows retention of the amplitude and phase information inherent to the underlying data, and provides a computationally efficient method of extrapolating data from a first to a second datum. After extrapolation, the data at the simulated source and receiver locations are processed using standard seismic imaging techniques. The images generated from the simulated source and receiver locations have improved accuracy due to the elimination of the portions of the raypaths which pass through regions of lesser interest. The images also have higher resolutions and higher signal-to-noise ratios than images produced from conventional processing techniques.

The method can be applied to simulate VSP or crosshole seismic data. It can therefore be applied to improve imaging of steep reflectors or below complex velocity structures, and for tomographic imaging. The method can also be applied to multi-borehole seismic data to simplify and reduce the cost of data processing.

BRIEF DESCRIPTION OF THE DRAWINGS

The present invention and its advantages will be more easily understood by reference to the following detailed description and the attached drawings in which.

While the invention will be described in connection with its preferred embodiments, it will be understood that the invention is not limited thereto. On the contrary, it is intended to cover all alternatives, modifications, and equivalents that may be included within the spirit and scope of the invention, as defined by the appended claims.

DETAILED DESCRIPTION OF THE INVENTION

Figure 1:
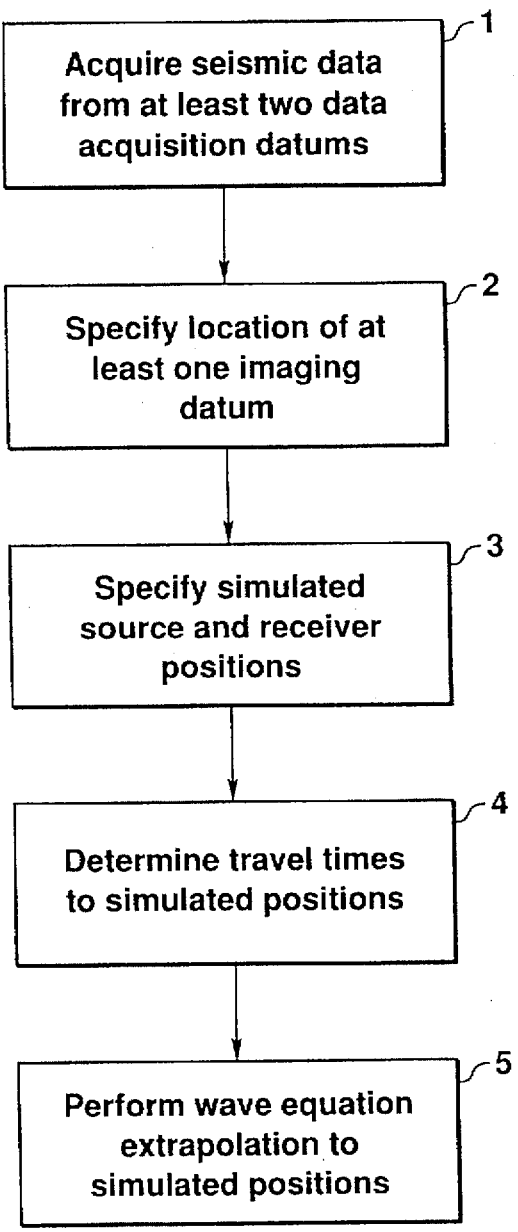
FIG. 1 schematically illustrates the steps required to implement the present invention.
Figure 2A:
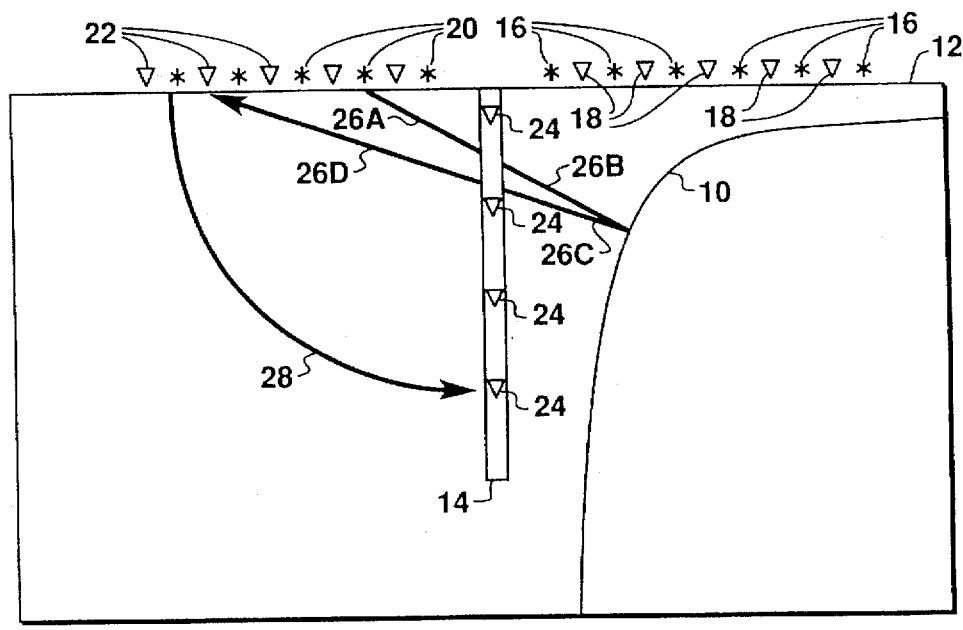
FIGS. 2A and 2B show a schematic view of an application of the present invention in which surface seismic data is used in conjunction with borehole seismic data to image a steeply dipping reflector.

The present method of extrapolating seismic data from a data acquisition configuration to an imaging configuration is summarized in flowchart form in FIG. 1. The method is also demonstrated in the embodiments depicted in FIGS. 2 through 6. In the first step of the invention, the analyst must acquire an appropriate dataset (step 1 in FIG. 1). The dataset must involve seismic sources placed along at least a first data acquisition datum and seismic receivers placed along at least a second data acquisition datum different from said first data acquisition datum. Receivers may also be placed along the first datum. As will be understood by those skilled in the art, the sources and receivers to be extrapolated will be sufficiently densely spaced to satisfy the aliasing requirement. A common application, such as shown in FIG. 2A, involves a set of sources and a set of receivers placed on a horizontal first data acquisition datum, which may be the earth's surface or an overlying body of water, and an additional set of receivers placed along a second data acquisition datum which is coincident with a borehole. In this application, the borehole will be adjacent to or overlie a reflector of interest. Other source-receiver configurations will be apparent to those skilled in the art.

Figure 2B:
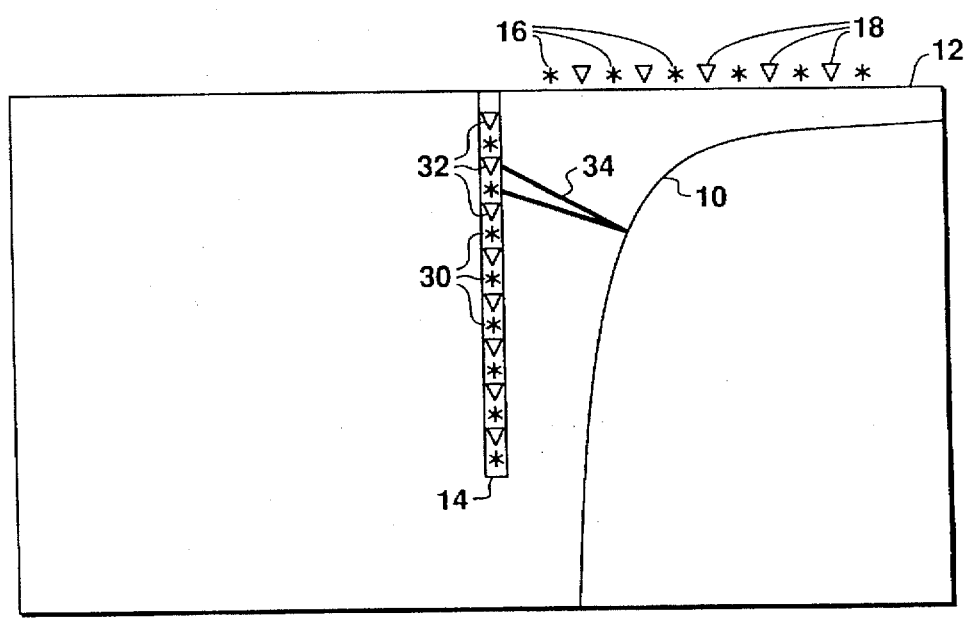

In the embodiment of the invention depicted in FIGS. 2A and 2B, single well imaging data is simulated from surface seismic data. The goal in this example is to accurately image steeply dipping reflector 10. Borehole 14 has been drilled through the earth's surface 12 adjacent to reflector 10. A first family of sources 20 is placed along surface 12 such that borehole 14 separates sources 20 from reflector 10. Family of sources 20 may comprise a single source 20 repeatedly activated at various positions along surface 12 or a plurality of sequentially activated sources placed on surface 12. For convenience, family of sources 20 will be referred to as sources 20. A first family of receivers 22 is also placed along surface 12 such that borehole 14 separates receivers 22 from reflector 10. A second family of sources 16 and a second family of receivers 18 are placed on surface 12 generally above reflector 10. The spacing density and the number of positions in sources 16, receivers 18, sources 20, and receivers 22 will be determined by the nature of reflector 10 and the aliasing requirement, as will be understood by those skilled in the art. Sources 16, receivers 18, sources 20, and receivers 22 all lie on surface 12 substantially along an assumed reference line, the first data acquisition datum (not shown), which passes through the intersection of borehole 14 with surface 12. A third family of receivers 24 is placed within borehole 14, which is coincident with a second data acquisition datum (not shown). Receivers 24 are referred to as vertical seismic profiling receivers, or VSPs.

A typical raypath for a signal from a source 20 to a receiver 22 consists of raypath segments 26A, 26B, 26C, and 26D. Segment 26A represents the direct arrival signal from sources 20 to receivers 24. The direct arrival is also referred to as the first arrival. Segments 26A, 26B and 26C in combination represent a reflected arrival from reflector 10 which is received by receivers 24. Segments 26A, 26B, 26C, and 26D in combination represent a reflected arrival from reflector 10 which is received by receivers 22.

In FIG. 2A, the region in which accurate seismic imaging is desired lies between borehole 14 and reflector 10. Segments 26A and 26D, which lie outside that region, are unnecessary. Processing of data relating to segments 26A and 26D merely increase analysis complexity and cost. In addition, the length and nearly horizontal nature of segments 26A and 26D tend to lead to increases errors in image generation due to the sensitivity of the image to errors in the horizontal velocity model. It is an object of the present invention to eliminate the processing of unnecessary raypath segments associated with the data acquisition datums, such as segments 26A and 26D, thereby improving the accuracy of the image of reflector 10 which is generated.

In step 2 of FIG. 1, the location of at least one imaging datum is specified. The imaging datum may be coincident with one of the data acquisition datums or may be located along a position not associated with any of the original source and receiver locations. The imaging datum, which will be determined by the image processing goal, will often provide for shorter raypaths to the feature of interest than the raypaths from the data acquisition datums to the reflector. In the embodiment of FIG. 2A, the above disadvantages of the first data acquisition datum are eliminated by specifying an imaging datum (not shown) coincident with both the second data acquisition datum and with borehole 14. That location provides for extrapolation of data from the first data acquisition datum to the imaging datum, as indicated by arrow 28.

In step 3 of FIG. 1, locations on the specified imaging datums of simulated sources and receivers are determined. The locations are the points from which the image of the feature of interest will ultimately be determined. In FIG. 2B, the imaging datum positions are shown as simulated borehole sources 30 and simulated borehole receivers 32. At this stage of the present invention no data is associated with the simulated sources and receivers; the positions merely represent the locations to which the data associated with sources 20 and receivers 22 will be extrapolated.

In step 4 of FIG. 1, traveltimes from data acquisition datum source and receiver positions to imaging datum simulated source and receiver positions are determined. The traveltimes are determined from direct measurements or from a velocity model, depending on the embodiment. In either case, the procedures required to determine traveltimes from seismic data will be well known to those skilled in the art.

In FIG. 2A, the traveltimes derive from direct measurements. The traveltimes to be determined are from the first data acquisition datum, coincident with surface 12, to the imaging datum, coincident with borehole 14. More specifically, in FIGS. 2A and 2B the traveltimes to be determined are from each source 20 to each simulated source 30 and from each receiver 22 to each simulated receiver 32. Initially, first arrival traveltimes are determined from the measurements between all sources 20 and all receivers 24. Because the simulated sources 30 and simulated receivers 32 will generally be more densely spaced than receivers 24, interpolation of the first arrival traveltimes may be necessary. For example, in FIG. 2A, receivers 24 are demonstratively depicted as being fairly widely spaced. In contrast, in FIG. 2B, simulated borehole receivers 32 are depicted as being fairly closely spaced. Because of that relative difference in spacing, certain of the simulated borehole receivers 32 will not have traveltimes which exactly correspond to any of the first arrival traveltimes determined for receivers 24. As a result, for the receivers 32 which fall in that category, the several most closely corresponding first arrival traveltimes must be interpolated to determine an appropriate traveltime to be used in the extrapolation. This procedure is repeated until traveltimes for all simulated sources 30 and all simulated receivers 32 have been determined. Suitable interpolation methods are well known in the art.

Note also that although in this embodiment sources 20 are associated with the seismic dataset to be used to image reflector 10, use of sources 20 for traveltime determination is not a requirement or limitation of the present invention. Specifically, a separate set of sources (not shown) could be used to determine traveltimes to receivers 24. Such a separate set could be used, for example, if it is decided to determine traveltimes from the horizontal first data acquisition datum to the imaging datum after the seismic dataset encompassed by sources 16, receivers 18, sources 20, and receivers 22 has been obtained. This attribute of the present invention allows the invention to be applied to pre-existing seismic datasets at relatively low incremental cost. Any differences in locations of sources used to determine traveltimes with the locations of sources 20 are resolved by interpolation.

Finally, in step 5 of FIG. 1, the traveltimes from step 4 are used in a wave equation extrapolation of the data from the original source and receiver positions to the simulated source and receiver positions. The advantage of using measured traveltimes is that the extrapolation will be kinematically accurate. Wave equation extrapolation provides a method of simulating the data that would be acquired had the original sources and receivers been placed at the locations of the simulated sources and receivers. The advantage of wave equation extrapolation is that all amplitude and phase information present in the original data is preserved, thus ensuring the accuracy of subsequent image processing using the simulated source and receiver positions. In the embodiment of FIGS. 2A and 2B, the data for sources 20 and receivers 22 are extrapolated to simulated sources 30 and simulated receivers 32.

Any form of the wave equation can be used for this extrapolation, provided that only traveltimes and not actual velocity fields are required. The preferred embodiment of the present invention employs a two dimensional form of the Kirchoff integral. The Kirchoff integral assumes that the wavefield is known on a line along one reference datum and that the wavefield is invariant in the third dimension. Using the traveltimes, the Kirchoff integral allows estimation of the wavefield at points along a second datum from data acquired along the reference datum. The publication of J. R. Berryhill "Wave Equation Datuming" *Geophysics*, 1979, Volume 44, pps 1329–1344, provides a detailed discussion of the Kirchoff extrapolation integral. In addition to the kinematic accuracy advantage noted above, the reliance on traveltimes only, and not absolute velocities, simplifies the analysis by removing an assumption inherent to such prior techniques as J. R. Berryhill "Submarine Canyons—Velocity Replacement by Wave Equation Datuming Before Stack" *Geophysics*, 1986, Volume 51, pps 2177–2184.

Three calculation methods for performing the Kirchoff integral will be known to those skilled in the art. The preferred method employs data in the space-time domain (commonly referred to as the x-t domain). Other methods which may be suitable to specific applications include the wavenumber-frequency (k-f) domain, and the space-frequency (x-f) domain. The present invention could also be implemented in a three dimensional embodiment by performing a two dimensional integration of the Kirchoff integral. Thus, the present invention could use a grid of 3-D data instead of a single line of 2-D data to perform the wavefield extrapolation. The wave propagation principles involved in wave equation extrapolation will be well known to those skilled in the art.

The extrapolated data can be processed using any available seismic data processing techniques. For example, surface seismic velocity analysis methods can be used to determine the optimum velocity field for imaging the data. These surface seismic methods usually only require knowledge of the root-mean-square average velocity field, which is also referred to as the RMS velocity field. The extrapolated data can therefore be imaged using RMS velocities, which are much easier to obtain than the interval velocity fields which are required to process borehole data using the VSP-CDP transform of Wyatt and to perform the direct prestack migration method of Wiggins. This advantage of the present invention simplifies and reduces the cost of the overall seismic processing effort. In addition, the present invention is computationally more efficient than the method of McClellan, as described above, since the Kirchoff extrapolation is completed before applying surface seismic processing. McClellan's technique does not include an integral or summation procedure, as does the present invention, and requires that costly walkaway VSP data be gathered. McClellan also cannot image data in which the extrapolated borehole source location would be above the receiver, whereas the present invention is not so constrained. Finally, because both sources and receivers are extrapolated, the present invention represents an additional improvement over such prior art as Ala'i, which can only simulate data with receivers in the well and sources at the surface, thus leaving long raypaths that are susceptible to errors.

The result of the extrapolation is a set of high multiplicity data with both sources and receivers in the borehole. In FIG. 2B, reflector 10 can be imaged using the extrapolated data from simulated sources 30 and simulated receivers 32 as well as the original data from sources 16 and receivers 18 to which the extrapolation procedure has not been applied. Conventional processing techniques can be applied to both the original and the extrapolated data. Specifically, surface seismic processing techniques commonly employed for Common Depth Point (CDP) gathers could be used. The images produced will be more accurate than surface seismic images because raypaths 34 associated with simulated sources 30 and simulated receivers 32 are shorter than raypaths 26A–D (see FIG. 2A) associated with sources 20 and receivers 22. In addition, because simulated receivers 32 have a denser spacing than receivers 24, the image of reflector 10 which results will have an higher resolution.

The present invention has a number of advantages over prior methods of imaging reflectors from surface seismic and VSP data. First, VSP receivers 24 shown in FIG. 2A are not used in this invention except to determine traveltimes from sources 20 and receivers 22 to simulated borehole sources 30 and simulated borehole receivers 32. The method does not require that reflected arrivals, indicated in FIG. 2A by raypath segments 26B and 26C, also be adequately recorded by VSP receivers 24. As a result, the VSP receivers do not have to be capable of acquiring high signal-to-noise ratio data. This advantage lowers data acquisition cost, since the VSPs required for this invention are thereby less expensive than conventional VSPs.

Second, conventional VSPs require a fairly close spacing of borehole receivers. This requirement derives from the difficulty in correlating the phases of reflections and other events after first arrival between depths. The receiver spacing must be sufficiently close to perform that correlation unambiguously using the narrow band data the VSPs acquire. This requirement, generally referred to as the aliasing condition, will be well understood to those skilled in the art. Because the present invention only requires first arrivals, the VSPs do not have to be closely spaced. For example, a receiver spacing of 200 ft would generally be adequate for the VSPs, compared to typical values of 50 ft for conventional VSPs. In addition, a surface source spacing for the VSP data of 500 ft would be acceptable, though acquisition cost would not be significantly increased if the VSP data were recorded from each surface source position at which surface seismic data is acquired. That would also facilitate simultaneous acquisition of the surface and VSP data.

Third, because the sources are all on the surface and the VSP receivers are only used to measure high amplitude direct arrival traveltimes, not the low amplitude reflected arrivals, the VSP data could even be acquired within the production tubing. That could lower acquisition cost significantly. And finally, problems associated with near-surface statics, such as the time-delays caused by the weathering layer, are eliminated by the extrapolation.

Figure 3A:
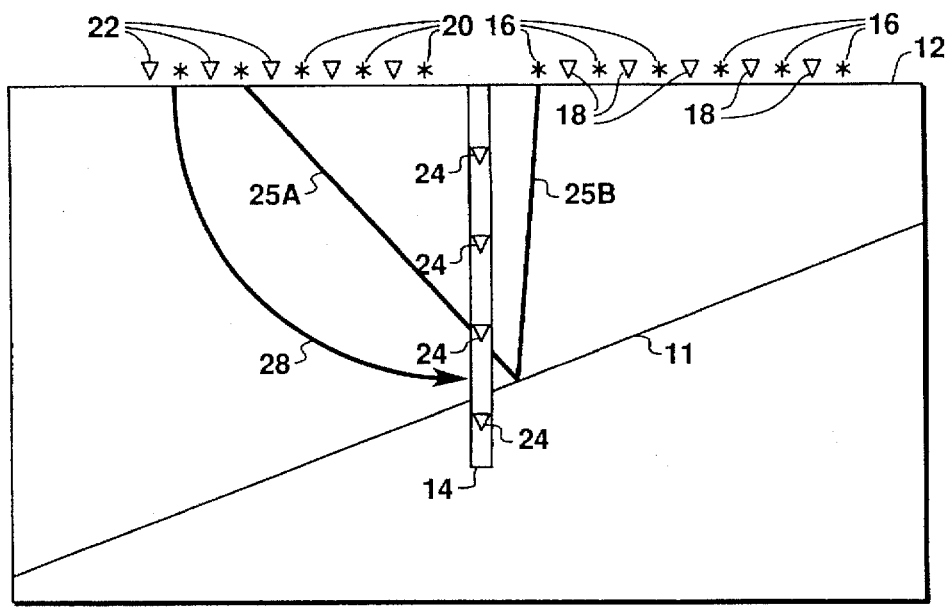
FIGS. 3A and 3B show the application of FIG. 2 where a reflector extends below the entire length of the surface seismic section.
Figure 3B:
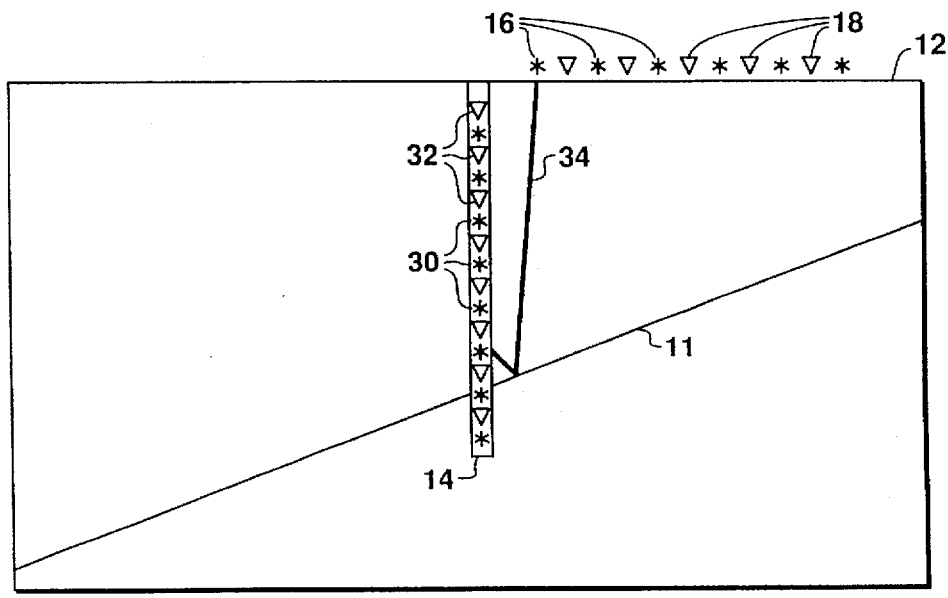

A second embodiment of the present invention is depicted in FIGS. 3A and 3B. In this embodiment, two data acquisition datums and one imaging datum are positioned as in FIGS. 2A and 2B. In addition, original and simulated sources and receivers are positioned as in FIGS. 2A and 2B. However, reflector 11, rather than being steeply dipping, is more nearly horizontally inclined, extending beneath sources 20 and receivers 22 as well as beneath sources 16 and receivers 18. The present invention is not limited to the steeply inclined reflector, but can be usefully applied to this reflector geometry.

In FIGS. 3A and 3B, the present invention proceeds as described above, except that raypath segment 25B does not reflect back to borehole receivers 24 and surface receivers 22 as do segments 26C and 26D in FIG. 2A. Rather, the reflection from reflector 11 is towards receivers 18. Nevertheless, first arrival traveltimes from sources 20 to receivers 24 are determined as described above, and the extrapolation to simulated sources 30 and simulated receivers 32 is performed. The invention in this embodiment shortens the length of the raypaths used in imaging reflector 11 from the length of raypath 25A–B, as shown in FIG. 3A, to the length of raypath 34, as shown in FIG. 3B, thereby allowing an image of reflector 11 to be developed using a source and receiver configuration similar to that depicted in FIG. 2B.

A third embodiment of the invention facilitates the imaging of reflectors below complex structures. Such reflectors are difficult to image using standard surface seismic techniques because many of the assumptions inherent to those techniques break down. The extrapolation technique can be used to accurately eliminate large portions of the reflection raypath, leaving behind a much shorter path that will generally be more straightforward to analyze.

Figure 4A:
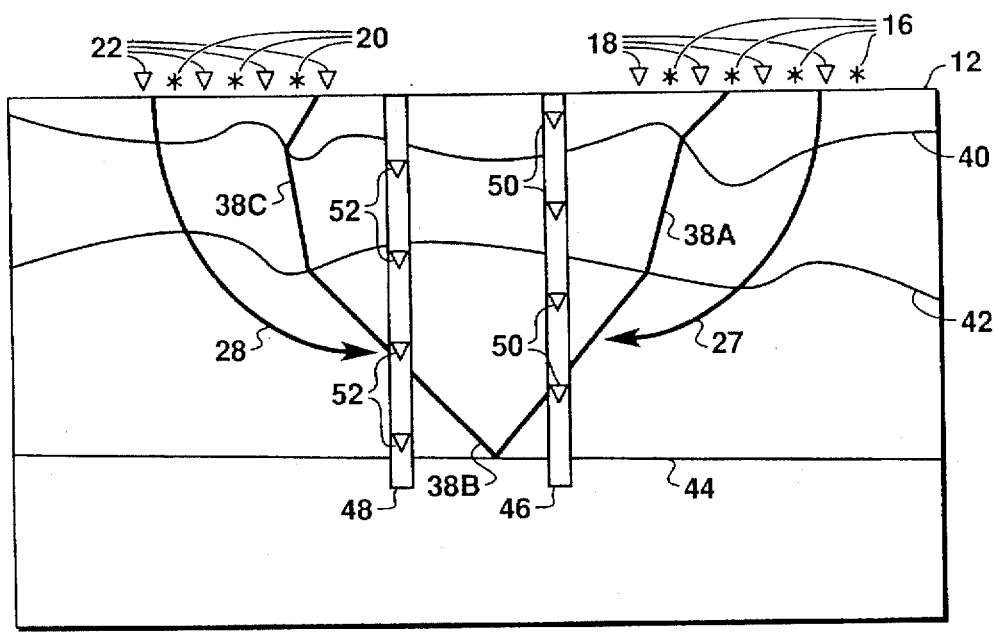
FIGS. 4A and 4B show an application of the present invention useful for imaging below a complex velocity structure.
Figure 4B:
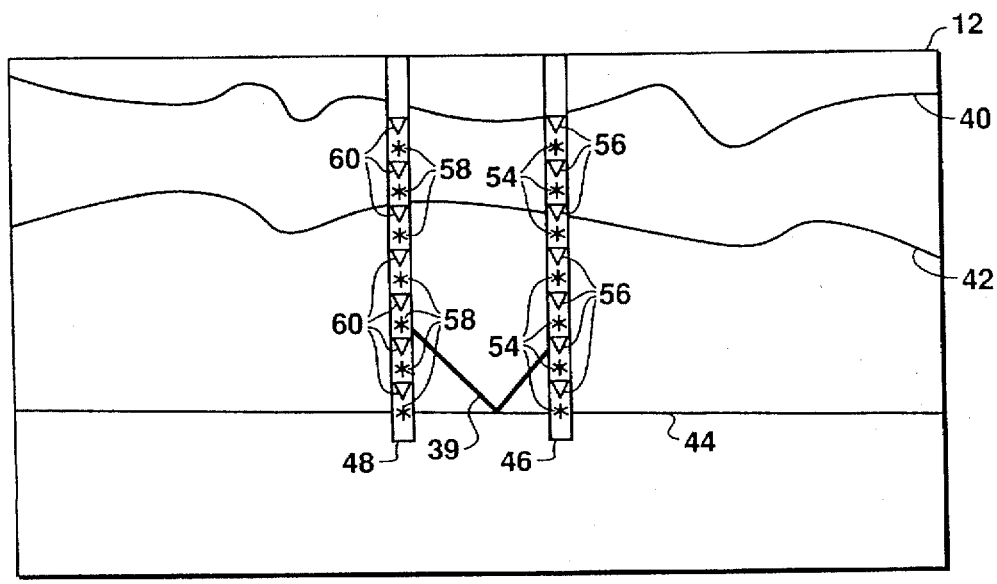

This embodiment is depicted in FIGS. 4A and 4B, where first borehole 46 and second borehole 48 have been drilled through geological interfaces 40 and 42. Interfaces 40 and 42 are not of interest to the analyst, but may have complicated velocity and raypath characteristics which make imaging of reflector 44, which is of interest to the analyst, more difficult. In this embodiment, a first family of sources 20 and a first family of receivers 22 are positioned along a first data acquisition datum (not shown) which extends along surface 12 from first borehole 48 in a direction generally away from second borehole 46. A second family of sources 16 and a second family of receivers 18 are positioned along a second data acquisition datum (not shown) which extends along surface 12 from second borehole 46 in a direction generally away from first borehole 48. Sources 16, receivers 18, sources 20, and receivers 22 will be positioned so as to be substantially in-line, with boreholes 46 and 48 intersecting surface 12 also substantially in that line. A third family of receivers 52 is placed in first borehole 48, and a fourth family receivers 50 is placed in second borehole 46. The third and fourth families of receivers are VSP receivers. A typical raypath for a signal from source 16 consists of segment 38A received by VSP receiver 50, continuing with segment 38B, which reflects from reflector 44 and is received by VSP receiver 52, and continuing with segment 38C, which is received by receiver 22. An analogous raypath can be drawn from sources 20 to receivers 18. As indicated above, the traveltime data from surface 12 to boreholes 46 and 48 does not have to be acquired simultaneously with each other. The traveltime data also does need to be acquired at the same time as the data encompassed by sources 16, receivers 18, sources 20, and receivers 22.

In this embodiment the method in FIG. 1 is performed twice. First, sources 20 and receivers 18 are extrapolated to simulated sources 58 and simulated receivers 56 in boreholes 48 and 46, respectively (FIG. 4B). This first extrapolation is shown in FIG. 4A by arrow 28 for sources 20 and by arrow 27 for receivers 18. Second, sources 16 and receivers 22 are extrapolated to boreholes 46 and 48, respectively. This second extrapolation is shown by arrow 27 for sources 16 and arrow 28 for receivers 22, and results in simulated sources 54 and simulated receivers 60. Of course, these extrapolations can be performed in either order. After both extrapolations, crosshole reflector imaging techniques can be applied to the simulated source and receiver data in both boreholes. The raypath complications resulting from interfaces 40 and 42 are eliminated by the extrapolation. In addition, the length of the raypath required to perform the imaging of the portion of reflector 44 between boreholes 46 and 48 is significantly shortened, as demonstrated by comparing raypath 39 in FIG. 4B with raypath 38A–C in FIG. 4A.

Figure 5A:
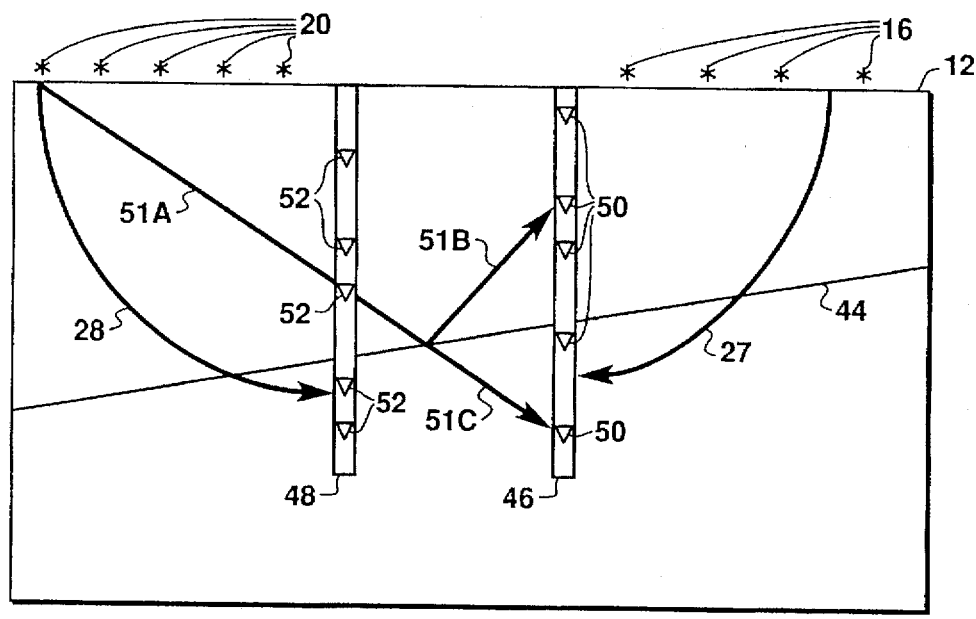
FIGS. 5A and 5B show an application of the present invention which allows simulation of crosshole data from multiwell VSP data.
Figure 5B:
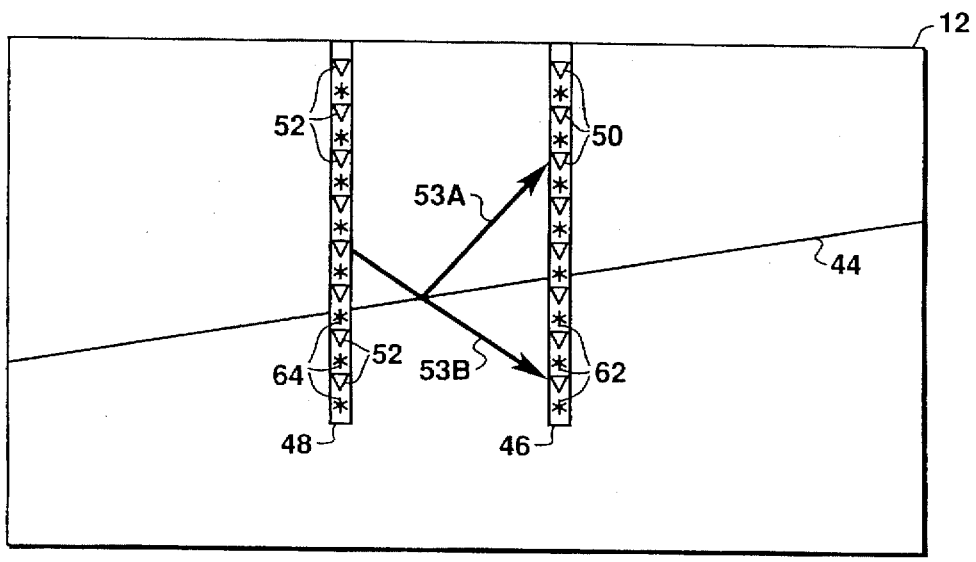

A fourth embodiment of the present invention, depicted in FIGS. 5A and 5B, allows for acquisition of crosshole tomographic data at reduced cost. Tomographic data is generally expensive because downhole seismic sources must be used. In addition, to prevent damage to the borehole, limitations must often be placed on the strength of the sources. For that reason, the tomographic data usually have a limited range over which images can be generated. In this embodiment of the present invention, more powerful surface seismic sources can be employed at reduced cost, thus improving the quality of the resulting images.

In FIG. 5A, data acquisition and imaging datums are positioned as above in FIG. 4A. Sources 16 and 20 and VSP receivers 50 and 52 are also positioned as in FIG. 4A. However, no surface receivers are required in this embodiment. A typical raypath for a signal from sources 20 consists of direct arrival segment 51A, which is received by receivers 52, continuing with segments 51B and 51C, which are reflected and direct arrivals received by receivers 50. Analogous raypath segments result from sources 16. Sources 16 and sources 20 will be sufficiently densely spaced to satisfy the aliasing condition. VSP receivers 50 and 52 do not need to acquire data simultaneously, but each position of receivers 50 and receivers 52 must acquire data from identical positions of sources 16 and sources 20.

As in FIG. 4, the method of the present invention is followed twice in this embodiment, resulting in the configuration depicted in FIG. 5B. Sources 16 and 20 are extrapolated to boreholes 46 and 48, respectively, as shown by arrows 27 and 28, resulting in simulated sources 62 and 64. The extrapolation can be performed in either order. No extrapolation of receivers is necessary. The simulated crosshole data sets which result will allow use of crosshole tomographic data processing methods since the direct arrivals will be present. In addition, the simulated crosshole data can be processed using reflector imaging or diffraction tomography.

The simulated crosshole data which results from this embodiment will retain all advantages of real crosshole data except signal bandwidth. Crosshole data generally achieves a broad signal bandwidth via use of broadband sources that are placed a short distance from the receivers. The limitation of that data is that the distance across which crosshole images can be formed is fairly small, generally less than 2,000 feet. The simulated crosshole data obtained from this embodiment allows use of conventional surface sources, thus limiting signal bandwidths somewhat. However, the use of borehole receivers and wave equation extrapolation allows development of improved quality images as compared to surface seismic data derived images, despite the bandwidth limitation. In addition, this embodiment will generally allow imaging over ranges larger than 2000 feet.

An additional benefit of this embodiment is that the simulated crosshole data will allow improved lateral resolution in the processed images. This improvement derives from the steeply angled raypaths generated by the high power surface sources. As noted, downhole sources generally have lower power output, thus limiting lateral resolution in the imaging of steeply dipping reflectors. This constraint of downhole sources is well known to those skilled in the art.

Figure 6A:
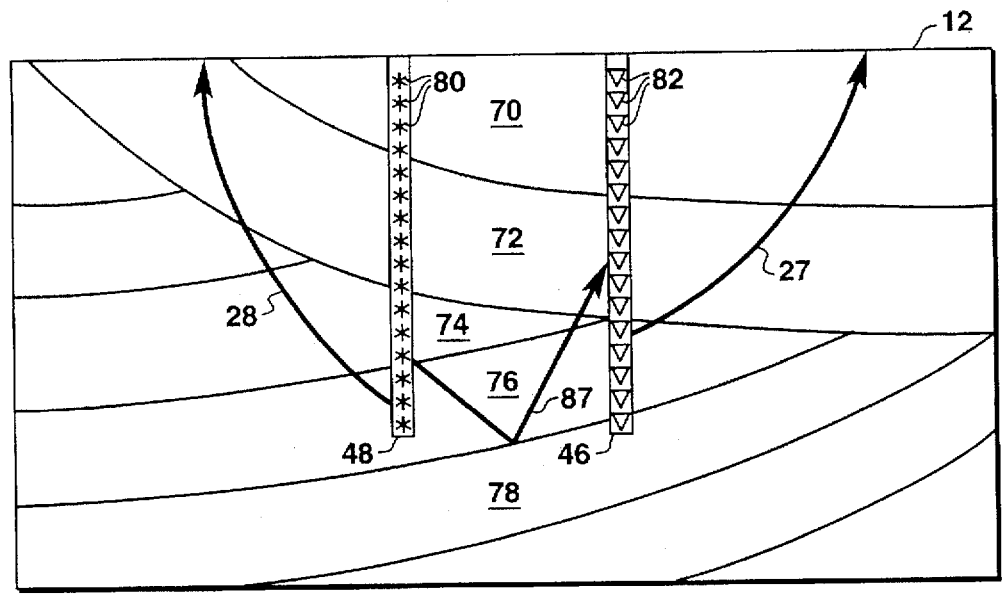
FIGS. 6A and 6B show an application of the present invention in which the goal is to extrapolate borehole source and receiver data to a surface datum to facilitate use of standard processing techniques.
Figure 6B:
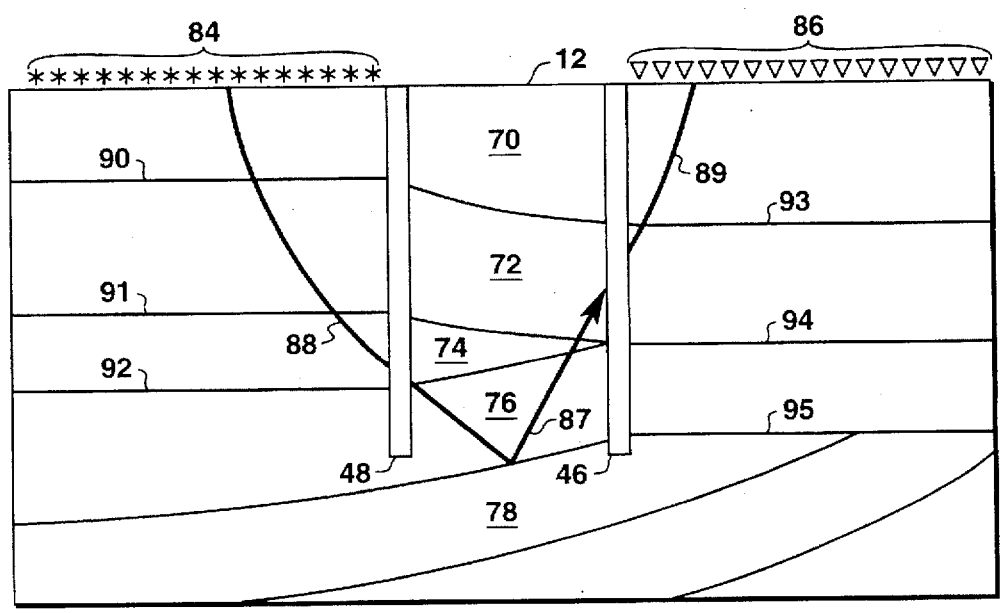

A fifth embodiment of the present invention, depicted in FIGS. 6A and 6B, demonstrates an application of the present invention in which the traveltimes in step 4 of FIG. 1 are determined from a velocity model. This embodiment overcomes velocity analysis problems which commonly arise in the analysis of multifold borehole seismic data. Sources 80 in borehole 48 and receivers 82 in borehole 46 are used to obtain crosshole data, as shown by raypath 87. However, geological layers 70, 72, 74, 76, and 78 have different seismic velocity characteristics. In addition, the layers dip or are folded between boreholes 46 and 48 such that the velocity versus depth curve for the boreholes are different. Because such techniques as the VSP-CDP transform and prestack migration each require a model of interval velocities as a function of depth, analysis of the crosshole data can be difficult under such circumstances.

By application of the present invention to this source-receiver configuration, the wave equation can be used to extrapolate the sources and receivers to a configuration which is more amenable to analysis by standard seismic data processing routines. As shown in FIG. 6B, one such more amenable configuration would have both sources and receivers on surface 12. Therefore, extrapolation of sources 80 and receivers 82 must proceed towards surface 12, as indicated by arrows 28 and 27, respectively. In this embodiment, first and second data acquisition datums are coincident with first and second boreholes 48 and 46, respectively. A first imaging datum is coincident with surface 12, extending from first borehole 48 in a direction generally away from second borehole 46. A second imaging datum is also coincident with surface 12, extending from second borehole 46 in a direction generally away from first borehole. A first family of simulated sources 84 and a first family of simulated receivers 86 are located on the first and second imaging datums, respectively, as shown in FIG. 6B. Sources 84 and receivers 86, and therefore both the first and second imaging datums, will be positioned so as to substantially form a line, with boreholes 46 and 48 intersecting surface 12 also substantially along that line.

The method of the present invention proceeds generally as discussed above for this embodiment. Note, however, that in FIG. 6A the subsurface regions through which the extrapolations occur, as indicated by arrows 28 and 27, are not regions through which raypath 87 associated with sources 80 and receivers 82 has traveled. As a result, measured traveltimes cannot be used in step 4 of FIG. 1. Instead, the extrapolation to the imaging datums can be done with traveltimes computed using any convenient, reasonable, assumed velocity models. The accuracy of these velocity models is not critical since the sole purpose of extrapolating the data to the imaging datums is to provide a dataset amenable to surface seismic data processing. This contrasts with the earlier embodiments of the present invention in which shortening raypaths to eliminate processing and raypath errors was an objective.

One example of a first velocity model which could be used in the extrapolation from first borehole 48 to simulated sources 84 would be a horizontal extension of the velocities measured in borehole 48, as indicated by lines 90, 91, and 92 in FIG. 6B. Similarly, a second velocity model for extrapolation of borehole receivers 82 to simulated receivers 86 could involve a horizontal extension of the velocities measured in borehole 46, as indicated by lines 93, 94, and 95 in FIG. 6B. Note that the first and second assumed velocity models do not need to be identical. Other convenient velocity models will be apparent to those skilled in the art.

In this embodiment the data in the region through which the extrapolation occurs is not of interest in subsequent analyses, and therefore inaccuracies in the assumed velocity model are of no consequence. More importantly, the assumed model will not introduce new errors during the subsequent analyses since the assumed model allows those analyses to create exact solutions in the extrapolation region. These exact solutions allow generation of exact extensions of raypath 87, which are shown in FIG. 6B as 88 and 89. Finally, after extrapolation, the simulated configuration has a simpler source and receiver geometry, allowing more cost effective, conventional velocity analysis and migration techniques to be used.

The embodiment of FIGS. 6A and 6B can be combined with the earlier embodiments of the present invention to further simplify seismic data processing. For example, the embodiment of FIGS. 2A and 2B results in relatively short raypaths from simulated sources 30 and simulated receivers 32 to reflector 10, as compared to the length of the raypaths from sources 20 and receivers 22. However, the most accurate image of reflector 10 will be generated if the data for simulated sources 30 and simulated receivers 32 and the data for sources 16 and receivers 18 are used in the image processing procedures. In addition, that image could be most efficiently generated if all of the data had a common surface datum. Therefore, once the configuration of FIG. 2B has been derived, the embodiment of FIG. 6A can be applied to the simulated data in borehole 14 to extrapolate that data back to the surface.

Specifically, as described above, simulated sources 30 and simulated receivers 32 in FIG. 2B are derived from an extrapolation which uses measured traveltimes. This extrapolation provides the benefits described above which result from shortening of raypath 26A–D in FIG. 2A to raypath 34 in FIG. 2B. Once derived, however, a second set of simulated sources and receivers (not shown) can be located on surface 12, using an extrapolation which relies on a simple velocity model as described above for the embodiment of FIGS. 6A and 6B. For example, the extrapolation of simulated sources 30 and simulated receivers 32 back to surface 12 could use a horizontal extension of the velocities measured in borehole 14. The result of this extrapolation will be a surface datum-referenced set of simulated sources and receivers (not shown) opposite borehole 14 from reflector 10, as well as original sources 16 and receivers 18 above reflector 10, which also have a surface datum. Because of the common surface datum, reflector 10 can be imaged using standard data processing techniques, which are generally more cost effective than are the dual datum techniques that would be required to process simulated sources 30, simulated receivers 32, sources 16 and receivers 18 in FIG. 2B; and because the second extrapolation uses an assumed horizontal velocity model, the subsequent data processing techniques benefit from simplified velocity and traveltime characteristics in the region opposite borehole 14 from reflector 10. Other combinations of the embodiments of the present invention will be apparent to those skilled in the art.

It will be understood by those skilled in the art that the present invention is applicable to both on land and offshore operations. Any type of on land or marine seismic source may be used to generate the seismic signals. It will be further understood that for on land operations the seismic source is often buried a distance up to 100 feet or more below the actual surface of the earth so that the seismic signal is generated below the weathered surface layers of earth which can greatly attenuate seismic signals. All such seismic sources are within the scope of the present invention. It will also be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method of imaging a geological feature, comprising the steps of:

(a) specifying two data acquisition datums, a first data acquisition datum coincident with a first borehole and a second data acquisition datum coincident with a second borehole;

(b) obtaining seismic data from a family of sources placed within said first borehole and a family of receivers placed within said second borehole;

(c) specifying two imaging datums, a first imaging datum coincident with the surface of the earth and proximate to said first borehole and a second imaging datum coincident with said surface and proximate to said second borehole, wherein a line coincident with said second imaging datum extends substantially colinear with said first imaging datum and sequentially through said second borehole, said first borehole, and said first imaging datum;

(d) wave equation extrapolating said family of sources to said first imaging datum using traveltimes calculated from a first velocity model;

(e) wave equation extrapolating said family of receivers to said second imaging datum using traveltimes calculated from a second velocity model; and (f) imaging said feature using said extrapolated sources and receivers.

* * * * *